June 9, 1936.  G. W. STICKLEY  2,043,717
VIBRATION DAMPER
Filed April 18, 1934
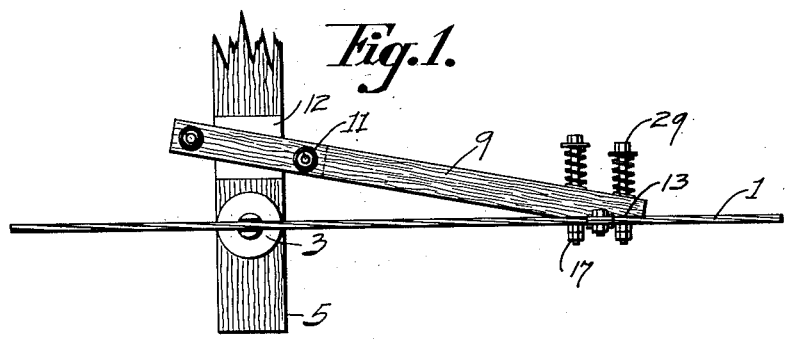
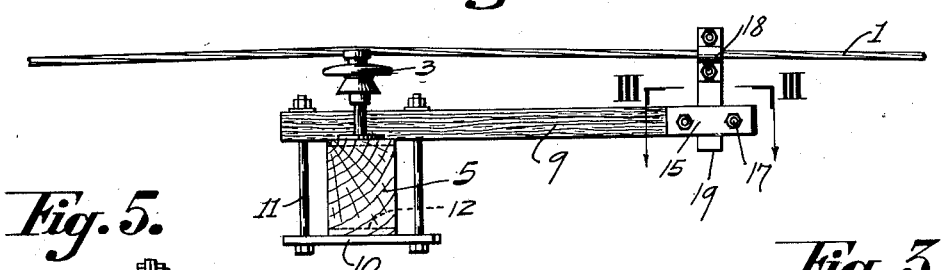
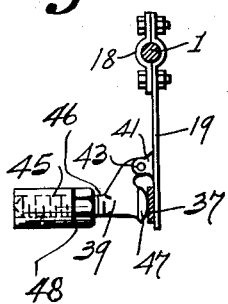
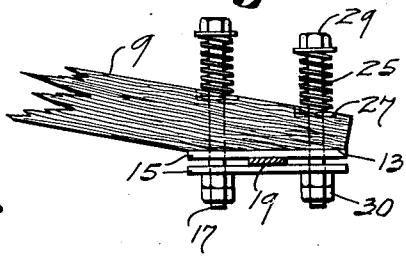
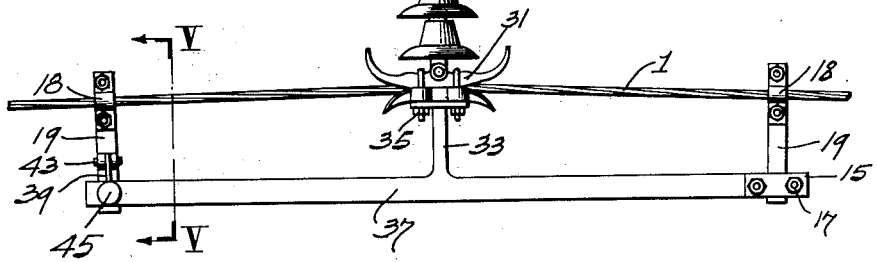
INVENTOR
George W. Stickley.
BY
ATTORNEY Patented June 9, 1936

2,043,717

UNITED STATES PATENT OFFICE 2,043,717

VIBRATION DAMPER

George W. Stickley, Massena, N. Y., assignor to Aluminum Company of America, Pittsburgh, Pa., a corporation of Pennsylvania Application April 18, 1934, Serial No. 721,159

7 Claims. (Cl. 248—63)

This invention relates to vibration dampers for electrical transmission lines. It relates particularly to vibration dampers of the type in which mechanical friction means are used to absorb the energy resulting from the vibration of the transmission line.

It is well known that any suspended wire or cable of the type generally used in transmission lines, irrespective of its construction, is subject to vibration under certain conditions, and that these vibrations exist practically entirely in a vertical plane. These vertical vibrations are continuous, having loops and nodes throughout the conductor span. The loop length, frequency, and amplitude of the vibration vary over a wide range in any given span due to variations in wind velocity and direction. The detrimental effects of these vibrations, such as causing fatigue failure of the cable at its points of support, have created a demand for devices capable of reducing or eliminating the vibration. To be effective for this purpose, the dampers or other devices employed must be capable of absorbing energy from the transmission line through a broad range of vibration frequencies. It has been found that while many of the dampers now in use are effective for certain ranges of frequency, their effectiveness is somewhat decreased during periods of vibrations at certain other frequencies.

An object of this invention is to provide a vibration damper which is effective irrespective of the frequency of vibration. Another object is to provide a vibration damper embodying mechanical friction means which is simple and economical to construct. Other objects will be apparent from the following description and the accompanying drawing, in which:

Fig. 1 is a plan view showing a portion of a transmission line and supporting structure therefor, with a vibration damper constructed in accordance with the invention;

Fig. 2 is a side elevation of the structure shown in Fig. 1;

Fig. 3 is a fragmentary sectional view taken on the line III—III of Fig. 2, but to a slightly enlarged scale;

Fig. 4 is a side elevational view of a modified form of the invention as applied to a suspended type of cable support;

Fig. 5 is a sectional view on the line V—V of Fig. 4, but to a somewhat enlarged scale.

Referring to the drawing, and particularly to Figs. 1, 2 and 3, a transmission or distribution line 1 is shown attached to a top cross tie insulator 3 which is mounted on a suitable cross bar 5 of a transmission or distribution line structure (not shown). A mass which is preferably, though not necessarily, in the form of a wooden bar 9 is rigidly secured to the cross bar below line 1 and slightly to one side of the insulator 3 in some suitable fashion, as by means of the clamp bar 10 and bolts 11. Between the bar 9 and the cross bar 5, and between the bar 9 and the bottom portion of the clamp 10, 11, a suitable insulator is provided. This insulator is illustrated in the drawing, as a block or plate 12 which may be of rubber, fibre, porcelain or any suitable insulating material. The other end of the bar 9 is beveled as shown at 13 to parallel the cable 1 and may be provided with metal strips 15 which are spaced slightly apart and secured to the bar by the bolts 17, as shown in Fig. 3. Rigidly attached to the line 1 by means of a clamp 18 and suspended therefrom is a link member 19 which passes between the strips 15. Frictional contact is maintained between the strips 15 and the link member 19 in some suitable fashion, as by providing a spring 25 between the washer 27 and the head 29 of the bolts 17. The amount of friction can be conveniently varied by increasing or decreasing the pressure on the spring by adjusting the nuts 30. The pressure between the strips 15 and the link 19 should be relatively small to permit perpendicular movement of the link 19 when the line 1 vibrates. The link 19 may be of any suitable material, but is preferably made of a thin strip of aluminum but may be of other metal. The strips 15 may be made of material similar to that of the link 19, although on lines where considerable friction results between the members, I have found it convenient to use materials of different degrees of surface hardness to prevent scoring and binding.

When the line 1 vibrates, the link 19 moves up and down between the strips 15. As soon as such movement occurs, the energy of the vibrating line is absorbed by friction between the parts of the assembly, so that the vibration cannot build up to any appreciable extent, or to an extent which would cause fatigue failure of the line, either at its point of attachment to the suspension clamp or in the span.

The embodiment of the invention illustrated in Fig. 4 is particularly adapted for use with two adjacent spans and shows another method of supporting the damper. In this form of the invention, the transmission line 1 is held by a typical insulated suspension clamp 31 attached to the cross bar of a transmission line tower (not shown). A standard 33 is dependent from the clamp 31 and may be conveniently fixed thereto by the clamping bolts 35. A bar 37 is provided which is rigidly attached at its central portion to the standard 33. A metal strip 15 similar to those provided in the embodiment of the invention illustrated in Figs. 1 to 3 is provided at one end of the bar 37. In frictional contact with the strip 15 and rigidly secured to the line 1 is a metal link 19 which passes between the strip 15 and the end of the bar 37. The amount of friction between the strip 15, bar 37 and the link 19 may be varied in a manner similar to that described in connection with the embodiment of my invention previously discussed—that is, by increasing or decreasing the pressure of springs (not shown) which are provided on the bolts 17. However, this is merely a convenient form of construction as other suitable means may readily be employed. For example, in Figs. 4 and 5 I have shown alternative means for maintaining the desired frictional contact which consists in a friction member 39 pivotally attached to a lug 41 on the link 19 by a pivot pin 43. The member 39 is provided with a weighted portion 45, and a foot 47 which is kept in contact with the bar 37 by the action of said weighted portion 45 about the pivot pin 43. Obviously this weight may be made laterally adjustable, if so desired, by providing a threaded shank 46 for engagement within a threaded aperture in the weight 45, a lock nut 48 being provided to secure the weight in adjusted position. By this construction the pressure against the bar 37 exerted by the foot 47 may be increased or decreased.

The advantages resulting from the use of my improved vibration damper will now be readily understood. By means of this device the possibility that the line will break near a point of suspension is substantially eliminated, since the difficulties which have heretofore caused most or all of the failures with the line are obviated. As a result, the reduction in vibration at the points of attachment of the transmission line results in a prolonged life for the line and maintenance costs are considerably reduced.

While I have described and illustrated my invention with special reference to certain preferred embodiments thereof, it is to be understood that these embodiments may be variously modified and that the invention may be otherwise embodied within the scope of the appended claims without departing from the spirit thereof. For example, the damper bars 9 or 37 may, if desired, be attached to any stationary structure adjacent the transmission line, and while in most instances it will be found preferable to utilize the cable supporting structure as a support for the damper bar I do not wish to be so limited.

I claim:

1. A vibration damper for a transmission line supported in spans by clamps, comprising a member immovably supported with respect to one of said clamps, a friction plate mounted at each end of said member, link members attached to said line in frictional engagement with said friction plates, and means incorporating an adjustable weight for regulating the frictional resistance between said friction plates and said link members.

2. A vibration damper for a transmission line, comprising a member rigidly secured to a support for said transmission line, a friction plate mounted at each end of said member, members connected at one end to said line in frictional engagement with said friction plates and said first-named member, and means incorporating an adjustable weight for varying the frictional resistance between said plates and said members.

3. A vibration damper for a transmission line, comprising a member rigidly secured adjacent a point of support of said transmission line, a friction plate mounted at each end of said member, members attached to said line and oscillatable therewith contacting said friction plates and said first-named member, and means incorporating an adjustable weight for varying the frictional resistance between said friction plates and said contacting members.

4. In a vibration damper for a transmission line, a member rigidly secured to a support for said transmission line having a friction plate mounted at each end thereof, said friction plates being in frictional engagement with members attached at one end to said line and movable therewith, and means incorporating an adjustable weight cooperating with at least one friction plate for varying the amount of friction.

5. In a vibration damper for a transmission line, a member rigidly secured to a support for said transmission line having a friction plate mounted at each end thereof, said friction plates being in frictional engagement with members attached at one end to said line and movable therewith, and means for regulating the frictional resistance between said second-named members and said plates, said friction-regulating means including an adjustable weight member mounted in cooperative pressure-applying relationship with respect to at least one of said friction plates.

6. In a vibration damper for a transmission line, a member rigidly secured at one end to a support for said transmission line, a friction plate mounted on the other end of said member, a member attached to the transmission line in frictional engagement with said friction plate, and an adjustable weight member pivotally attached to said second-mentioned member, said weight member being adapted to press the friction plate into bearing relationship with the second-mentioned member.

7. In a vibration damper for a transmission line, an energy-absorbing mechanism comprising a member rigidly secured to a support for the transmission line, a second member secured to said line and movable therewith, said first and second-mentioned members being in frictional engagement with each other, an arm pivotally attached to said second-mentioned member and having a foot in contact with said first-mentioned member whereby said first-mentioned member is disposed between said second-mentioned member and foot in frictional engagement with each other, and a weight adjustably associated with said foot whereby the aforesaid frictional engagement may be regulated.

GEORGE W. STICKLEY.